US012603050B2

(12) United States Patent
Kim et al.

(10) Patent No.: US 12,603,050 B2

(45) Date of Patent: Apr. 14, 2026

(54) MICRO DISPLAY DEVICE

(71) Applicant: LG DISPLAY CO., LTD., Seoul (KR)

(72) Inventors: Sangkyu Kim, Paju-si (KR); JaeKyeong Yun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/949,711

(22) Filed: Nov. 15, 2024

(65) Prior Publication Data

US 2025/0265989 A1 Aug. 21, 2025

(30) Foreign Application Priority Data

Feb. 15, 2024 (KR) ........................ 10-2024-0022056

(51) Int. Cl.

*G09G 3/3233* (2016.01)
*G09G 3/20* (2006.01)
*G09G 3/3291* (2016.01)

(52) U.S. Cl.

CPC ......... *G09G 3/3233* (2013.01); *G09G 3/2003* (2013.01); *G09G 3/3291* (2013.01); *G09G 2300/0408* (2013.01); *G09G 2300/0452* (2013.01); *G09G 2300/0819* (2013.01); *G09G 2300/0842* (2013.01); *G09G 2320/0242* (2013.01)

(58) Field of Classification Search

CPC .. G09G 3/3233; G09G 3/2003; G09G 3/3291; G09G 2300/0408; G09G 2300/0452; G09G 2300/0819; G09G 2300/0842; G09G 2320/0242

See application file for complete search history.

(56) References Cited

U.S. PATENT DOCUMENTS

2021/0312857 A1* 10/2021 Mosier ..................... G09G 3/32
2022/0102583 A1* 3/2022 Baumheinrich ... G02B 6/12007

* cited by examiner

*Primary Examiner* — Kenneth B Lee, Jr.

(74) *Attorney, Agent, or Firm* — Birch, Stewart, Kolasch & Birch, LLP

(57) ABSTRACT

A micro display device can include a pixel unit disposed on a display panel, the pixel unit including a red subpixel, a green subpixel and a blue subpixel, a first power source voltage line including a first line connected between a first power source voltage supply terminal and the red subpixel, a second line connected between the first power source voltage supply terminal and the green subpixel, and a third line connected between the first power source voltage supply terminal and the blue subpixel, and a first resistance unit connected to at least a portion of the first power source voltage line.

20 Claims, 11 Drawing Sheets

MICRO DISPLAY DEVICE

CROSS-REFERENCE TO RELATED APPLICATION

This application claims priority to Korean Patent Application No. 10-2024-0022056, filed in the Republic of Korea, on Feb. 15, 2024, the entirety of which is hereby incorporated by reference into the present application for all purposes as if fully set forth herein.

BACKGROUND

Field

The disclosure relates to a micro display device.

Description of Related Art

The display device includes a display panel including a plurality of subpixels, and various driving circuits such as a source driving circuit and a gate driving circuit for driving the display panel.

In the display panel of the conventional display device, transistors, various electrodes, various signal lines, and the like are formed on a glass substrate, and the driving circuits that can be implemented as integrated circuits are mounted on a printed circuit and are electrically connected to the display panel through the printed circuit.

This conventional type of structure is suitable for large display devices, but it is not suitable for small display devices. For example, there are disadvantages when a glass substrate is used in a small display device.

Therefore, many types of electronic devices that use a small display device are nowadays emerging, such as virtual reality devices, augmented reality devices, and the like.

However, a need exists for a small display device that has excellent display performance or a structure suitable for small electronic devices, such as virtual reality devices or augmented reality devices. Also, a needs exists for a display device that can improve a color luminance ratio imbalance.

SUMMARY OF THE DISCLOSURE

To address the foregoing issues, the disclosure is directed to a micro display device capable of addressing the above noted issues, including addressing color luminance ratio imbalance of micro displays.

A display device according to an embodiment of the disclosure can include a pixel unit disposed on a display panel and including a red subpixel, a green subpixel, and a blue subpixel, first power source voltage lines connected to a first power source voltage supply terminal to supply a first power source voltage to each of the red subpixel, the green subpixel, and the blue subpixel, and a first resistance unit commonly connected to the first power source voltage lines.

Although the disclosure has been shown and described in connection with example embodiments thereof, it will be appreciated by one of ordinary skill in the art that various changes or modifications can be made thereto without departing from the scope of the disclosure.

According to an embodiment of the disclosure, it is possible to address color luminance ratio imbalance by reducing the current flowing through a low-voltage driving voltage line when emitting white light by simultaneously driving the red subpixel R, green subpixel G, and blue subpixel B in the micro display.

According to an embodiment of the disclosure, it is possible to address luminance ratio difference between pixels emitting different colors of light by having a resistor in a micro display.

In other words, it is possible to reduce the difference between the white emission luminance and the sum of the respective emission luminances of the red subpixel, green subpixel, and blue subpixel.

The effects of the disclosure are not limited thereto, and the disclosure encompass other various effects.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
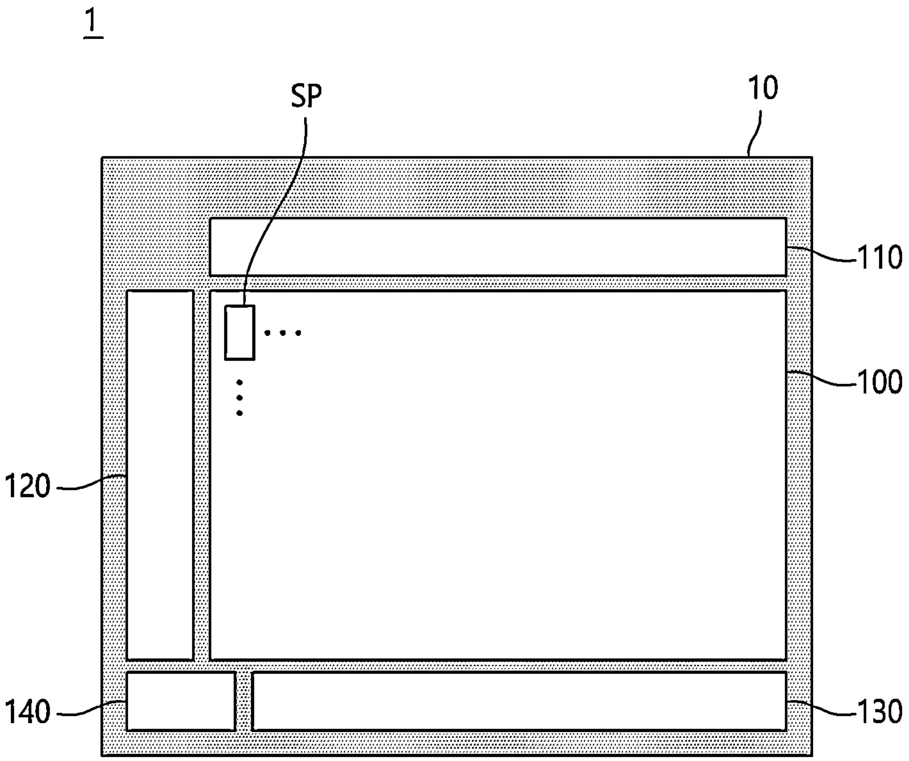
FIG. 1 is a view schematically illustrating a micro display device according to embodiments of the present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as “including,” “having,” “containing,” “constituting”

"make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "may" and vice versa.

Hereinafter, various embodiments of the disclosure are described in detail with reference to the accompanying drawings.

FIG. 1 is a view schematically illustrating a micro display device 1 according to the present embodiments.

Referring to FIG. 1, a micro display device 1 according to the present embodiments can have a backplane structure in which a pixel array 100 and various driving circuits are configured on a silicon substrate 10.

As used herein, the term "micro" can mean that the size of the micro display device 1 is small, or even if the size of the micro display device 1 is not small, it can mean that a manufacturing process is finely performed to produce it.

Figure 2:
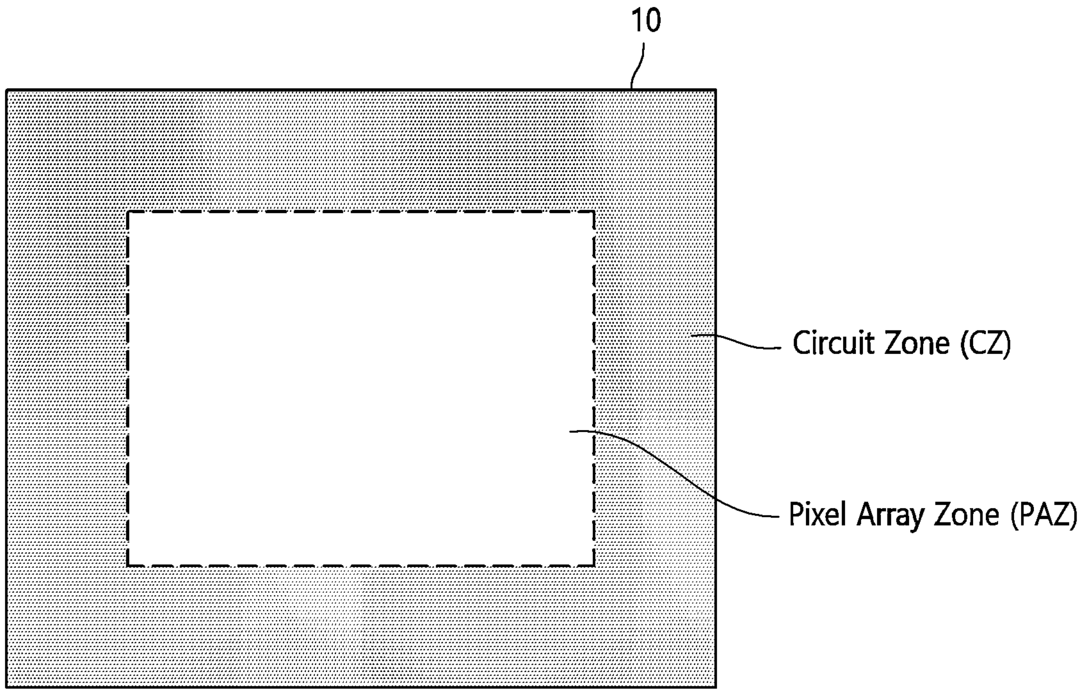
FIG. 2 is a view illustrating two zones of a silicon substrate of a micro display device according to an embodiment of the present disclosure.

FIG. 2 is a view illustrating two zones of a silicon substrate 10 of a micro display device 1 according to the present embodiments.

The silicon substrate 10 can be of a p-type or an n-type. In the disclosure, "p" means hole, and "n" means electron.

The silicon substrate 10 can include a pixel array zone PAZ and a circuit zone CZ.

Accordingly, the micro display device 1 according to the present embodiments can include the pixel array 100 including the plurality of subpixels SP arranged in the pixel array zone PAZ of the silicon substrate 10 and driving circuits arranged in the circuit zone CZ of the silicon substrate 10.

The circuit zone CZ of the silicon substrate 10 can be positioned around the pixel array zone PAZ of the silicon substrate 10.

A plurality of subpixels SP, as well as signal lines for supplying various signals and voltages to the plurality of subpixels SP, can be arranged in the pixel array zone PAZ of the silicon substrate 10.

The signal lines can include data lines for transferring a data voltage corresponding to an image signal and gate lines for transferring a scan signal (gate signal).

Further, the signal lines disposed in the pixel array zone PAZ of the silicon substrate 10 can further include a driving voltage line for transferring a driving voltage, and in some situations, can further include a sense line for transferring a reference voltage or sensing a voltage.

Signal lines disposed in the pixel array zone PAZ of the silicon substrate 10 can be electrically connected to driving circuits disposed in the circuit zone CZ of the silicon substrate 10.

The driving circuits disposed in the circuit zone CZ of the silicon substrate 10 can include a source driving circuit 110 for driving data lines, a gate driving circuit 120 for driving gate lines, and a control circuit 130 for controlling operations of the source driving circuit 110 and the gate driving circuit 120.

Here, the source driving circuit 110 can also referred to as a data driving circuit, a data driver or a source driving integrated circuit (or source driver IC (SDIC)). The gate driving circuit 120 can also referred to as a scan driving circuit, gate driver or a gate driving integrated circuit (or gate driver IC (GDIC)). The control circuit 130 can be a timing controller or a controller including the timing controller.

The driving circuits disposed in the circuit zone CZ of the silicon substrate 10 can further include a power circuit 140 for providing various signals and voltages used to drive the subpixels SP arranged in the pixel array zone PAZ of the silicon substrate 10 to the other circuits 110, 120, and 130, or supplying the signals and voltages to the pixel array 100.

Here, the power circuit 140 can include a power generator such as a DC-DC converter.

The driving circuits disposed in the circuit zone CZ of the silicon substrate 10 can further include at least one interface for electrical connection, signal input/output, or communication with other electronic components.

The interfaces can include, e.g., one or more of a low-voltage differential signaling (LVDS) interface, a mobile industry processor interface (MIPI), a serial interface, and the like.

As described above, by forming not only the pixel array 100, but also driving circuits such as the source driving circuit 110, the gate driving circuit 120, the control circuit 130, and the power circuit 140 on the same silicon substrate 10, the device size can be reduced, and the manufacturing process can be efficiently and quickly performed.

Meanwhile, the circuit zone CZ can be present on one side, two sides, or three sides of the pixel array zone PAZ, or can be present while surrounding the outer periphery of the pixel array zone PAZ.

The source driving circuit 110 can be present only on one side of the pixel array zone PAZ, or can be present on two opposite sides (upper and lower sides, or left and right sides).

The gate driving circuit 120 can be present only on one side of the pixel array zone PAZ, or can be present on two opposite sides (left and right sides or upper and lower sides).

Figure 3:
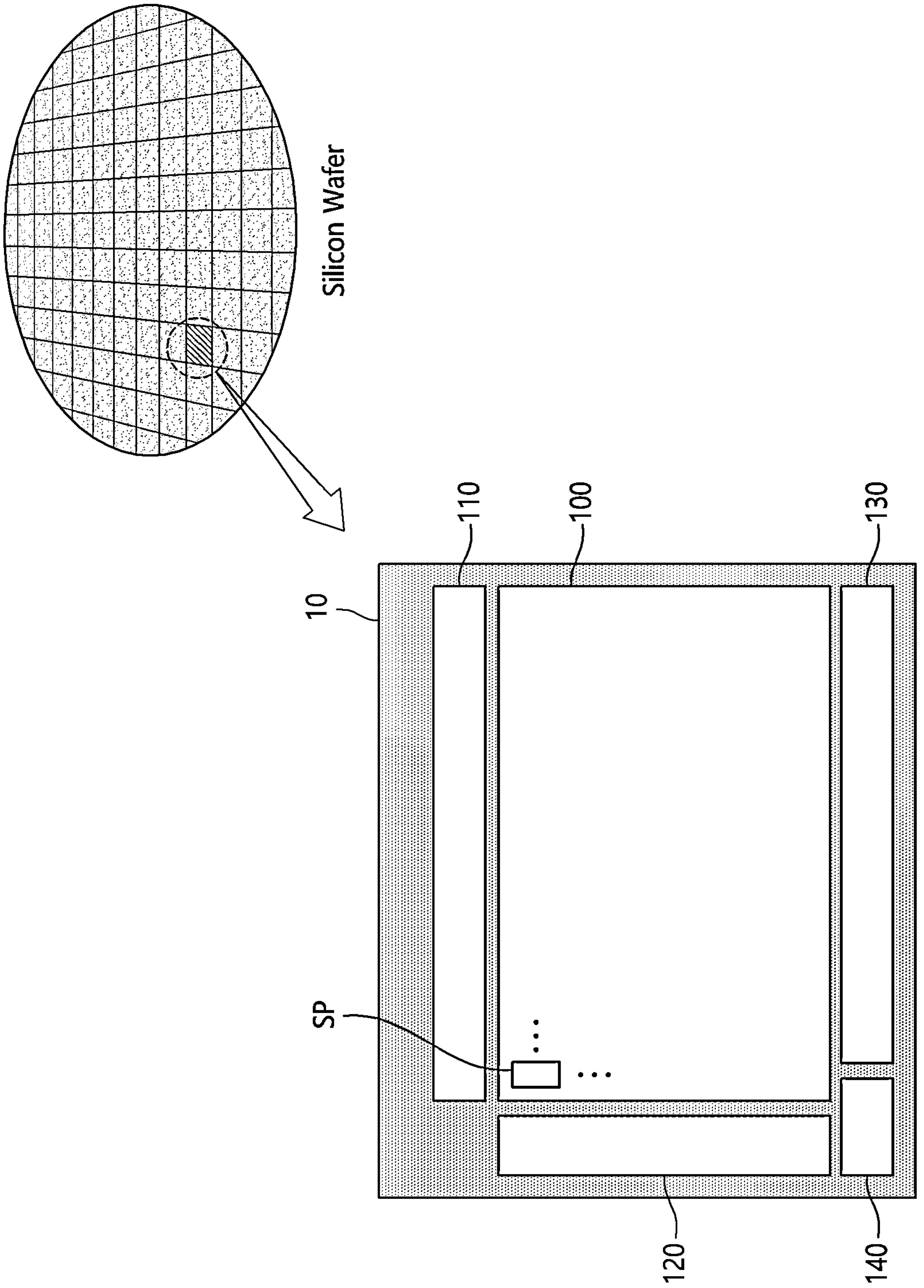
FIG. 3 is a view illustrating a micro display device and a silicon wafer according to an embodiment of the present disclosure.

FIG. 3 is a view illustrating a micro display device 1 and a silicon wafer according to the present embodiments.

The whole or part of the micro display device 1 according to the present embodiments described above can be made in a process of manufacturing a silicon wafer.

From this point of view, the whole or part of the micro display device 1 according to the present embodiments can be viewed as a type of integrated circuit made through a silicon wafer manufacturing process (semiconductor process). In other words, large numbers of the micro display device 1 can be made through a manufacturing process applied to a same silicon wafer. For example, many micro display devices can be made together on the same silicon wafer, and then the wafter can be cut and divided to separate the individual micro display devices from each other as desired.

Accordingly, the whole or part of the micro display device 1 according to the present embodiments can be referred to as a display integrated circuit.

For example, the display integrated circuit according to the present embodiments can include a silicon substrate 10, a plurality of subpixels SP arranged in the pixel array zone PAZ of the silicon substrate 10, and driving circuits arranged in the circuit zone CZ of the silicon substrate 10 positioned around the pixel array zone PAZ.

As described above, since the whole or part of the micro display device 1 according to the present embodiments is made through a silicon wafer manufacturing process, there is an advantage of being able to manufacture large numbers of the micro display device 1 precisely, efficiently, and conveniently.

The micro display device 1 according to the present embodiments can be an organic light emitting diode (OLED) display, or can be another type of display such as a liquid crystal display (LCD).

Hereinafter, it is assumed that the micro display device 1 according to the present embodiments is an OLED display.

Figure 4:
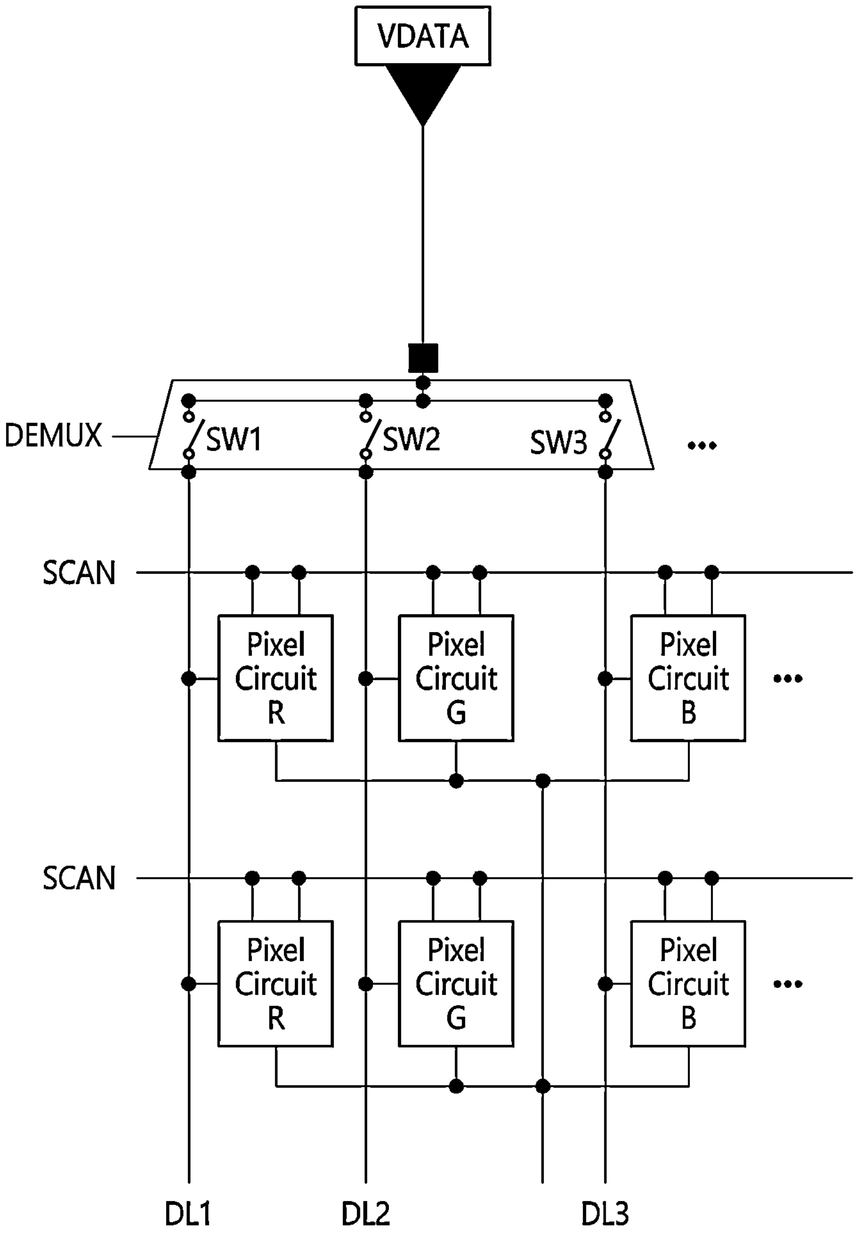
FIG. 4 is a plan view schematically illustrating a switch configuration of a micro display device according to an embodiment of the present disclosure.

FIG. 4 is a plan view schematically illustrating a switch configuration of a micro display device according to the present embodiments. The micro display according to embodiments of the disclosure can include a switch to reduce the number of pads. For example, the number of data pads corresponding to the data lines can be reduced, which can reduce wiring and save space.

Referring to FIG. 4, the disclosure time-divisionally supplies a data voltage VDATA output from the source driving circuit 110 through one channel to N data lines using a demultiplexer DEMUX (where N is a natural number of 2 or more).

In the following embodiments, the demultiplexer is described as having a 1:3 MUX structure for connecting one output terminal of the source driving circuit 110 to three data lines as an example, but the disclosure is not limited thereto.

The demultiplexer DEMUX can include a first switch SW1 connected to a first data line DL1, a second switch SW2 connected to a second data line DL2, and a third switch SW3 connected to a third data line DL3.

For example, the first data line DL1 can be connected to a red subpixel, the second data line DL2 can be connected to a green subpixel, and the third data line DL3 can be connected to a blue subpixel. This is merely an example, and the connection relationship between the subpixel and the data line is not limited thereto.

Accordingly, the demultiplexer DEMUX can connect the output terminal to one of the first data line DL1, the second data line DL2, and the third data line DL3 using the first switch SW1, the second switch SW2, and the third switch SW3, and transfer the data voltage applied from the source driving circuit 110 to the data line connected to the output terminal.

Figure 5:
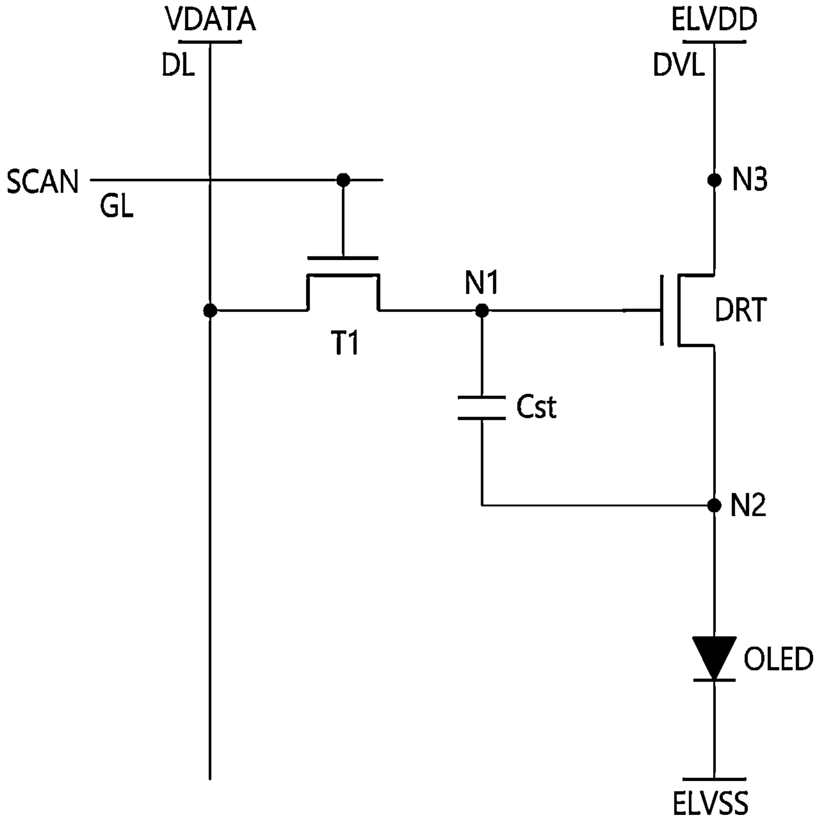
FIG. 5 is an example view illustrating a subpixel structure of a micro display device according to an embodiment of the present disclosure.

FIG. 5 is an example view illustrating a subpixel structure of a micro display device 1 according to the present embodiments.

In the micro display device 1 according to the present embodiments, each of the plurality of subpixels SP can include an organic light emitting diode OLED, a driving transistor DRT for driving the organic light emitting diode OLED, a first transistor T1 electrically connected between a first node N1, which is the gate node of the driving transistor DRT, and a data line DL, and a capacitor Cst electrically connected between the first node N1 of the driving transistor DRT and a second node N2, which is the source node or the drain node of the driving transistor DRT.

The organic light emitting diode OLED can include a first electrode, an organic light emitting layer, and a second electrode.

The first electrode of the organic light emitting diode OLED can be the anode electrode (or the cathode electrode), and the second electrode of the organic light emitting diode OLED can be the cathode electrode (or the anode electrode).

A base voltage ELVSS can be applied to the second electrode of the organic light emitting diode OLED.

The driving transistor DRT includes the first node N1, the second node N2, and the third node N3 as electrical nodes.

In the driving transistor DRT, the first node N1 can correspond to the gate node and can be electrically connected to the source node or the drain node of the first transistor T1. The second node N2 corresponds to the source node or the drain node and can be electrically connected to the first electrode of the organic light emitting diode OLED. The third node N3 can be electrically connected to the driving voltage line DVL to receive the driving voltage ELVDD.

The first transistor T1 can be controlled to be turned on and off by the scan signal SCAN applied to the gate node through the gate line GL, and can be electrically connected between the data line DL and the first node N1 of the driving transistor DRT.

In the first transistor T1, the gate node can be electrically connected to the gate line GL, the drain node or the source node can be electrically connected to the data line DL, and the source node or the drain node can be electrically connected to the first node N1 of the driving transistor DRT.

When the first transistor T1 is turned on by the scan signal SCAN, the first transistor T1 can transfer the data voltage VDATA supplied from the data line DL to the first node N1 of the driving transistor DRT.

Figure 6:
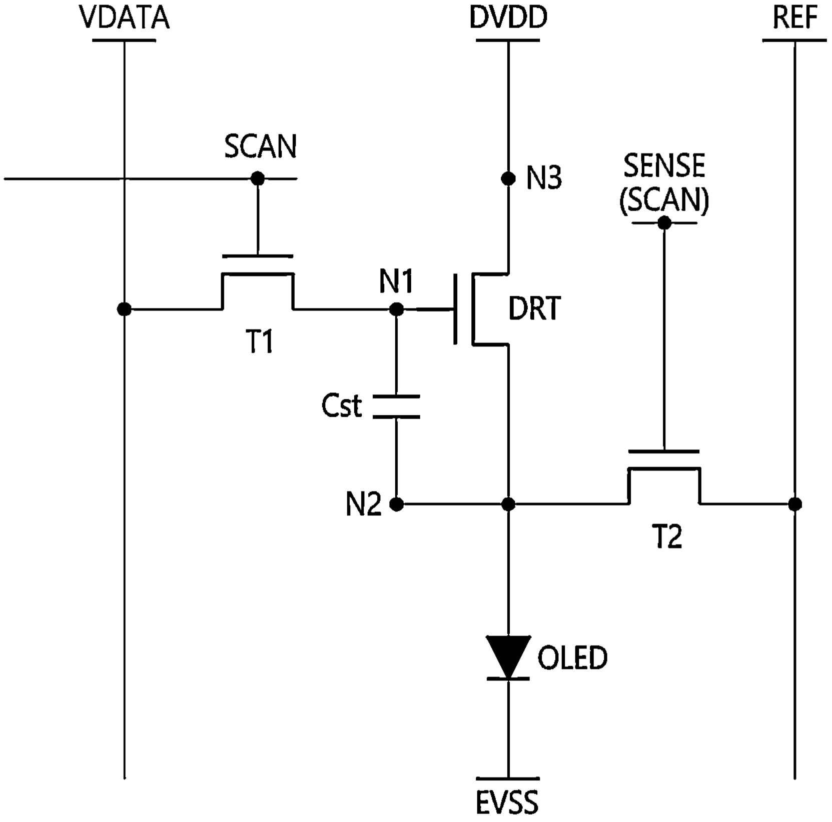
FIG. 6 is another example view illustrating a subpixel structure of a micro display device according to an embodiment of the present disclosure.

FIG. 6 is another example view illustrating a subpixel structure of a micro display device 1 according to the present embodiments.

Referring to FIG. 6, in the micro display device 1 according to the present embodiments, each of the plurality of subpixels SP can further include a second transistor T2 electrically connected between the second node N2 of the driving transistor DRT and the sense line SL for sensing characteristics of the subpixel to perform a compensation operation.

In the second transistor T2, the gate node can be electrically connected to the gate line GL, the drain node or the source node can be electrically connected to the sense line SL, and the source node or the drain node can be electrically connected to the second node N2 of the driving transistor DRT.

The second transistor T2 can be controlled to be turned on and off by the scan signal SCAN applied to the gate node.

In the subpixel structure of FIG. 6, the gate node of the first transistor T1 and the gate node of the second transistor T2 can be electrically connected to each other and can be commonly connected to one gate line GL.

In this situation, the gate node of the first transistor T1 and the gate node of the second transistor T2 can receive the scan signal SCAN together.

Alternatively, the gate node of the first transistor T1 and the gate node of the second transistor T2 can be separately connected to different gate lines GL.

In this situation, the gate node of the first transistor T1 and the gate node of the second transistor T2 can individually receive the scan signal SCAN.

The second transistor T2 can be turned on to apply the reference voltage VSS to the second node N2 of the driving transistor DRT.

Further, the second transistor T2 can be turned off to electrically float the second node N2 of the driving transistor DRT.

As described above, through the second transistor T2 and the sense line SL, the voltage state of the second node N2 of the driving transistor DRT can be controlled according to the driving type, the driving situation, and the like.

Each of the driving transistor DRT, the first transistor T1, and the second transistor T2 can be an n-type transistor or a p-type transistor.

The storage capacitor Cst is not a parasitic capacitor (e.g., Cgs, Cgd), which is an internal capacitor present between the first node N1 and the second node N2 of the driving transistor DRT, but an external capacitor intentionally designed outside the driving transistor DRT.

Figure 7:
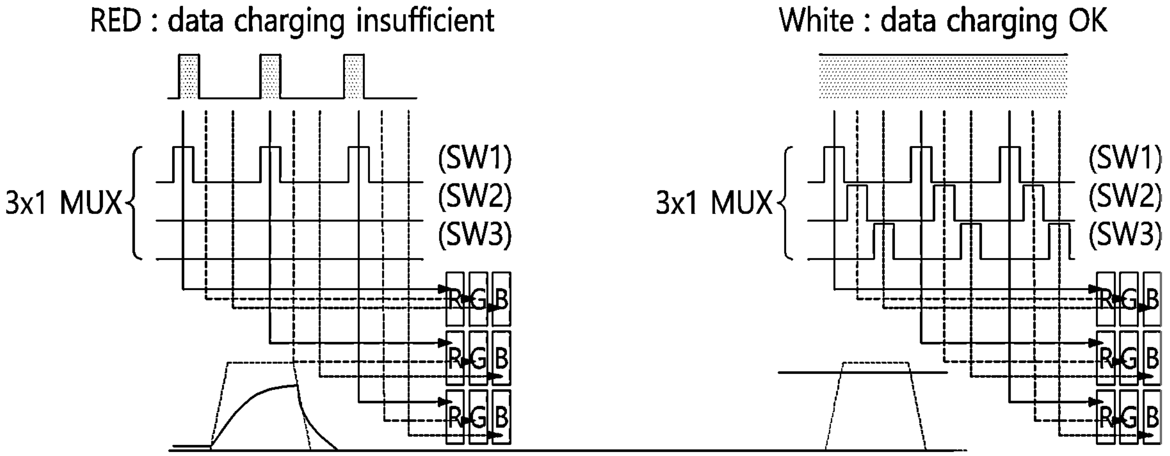
FIG. 7 is an example view illustrating a cause of occurrence of a difference between a W emission luminance and the sum of R, G, and emission luminances.
Figure 8:
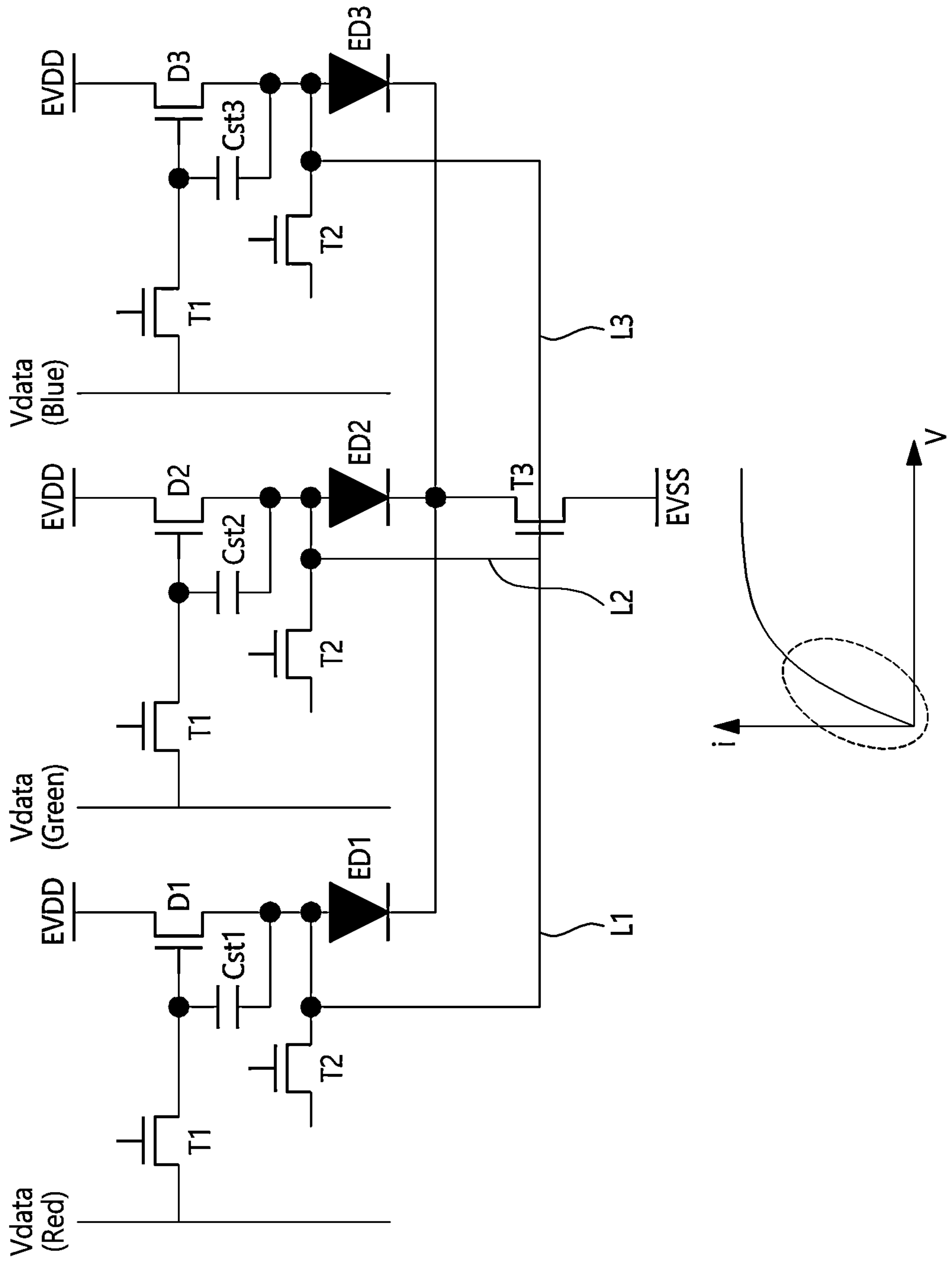
FIGS. 8 and 9 are equivalent circuit diagrams illustrating examples of a partial pixel structure of a micro display device according to embodiments of the present disclosure.
Figure 9:
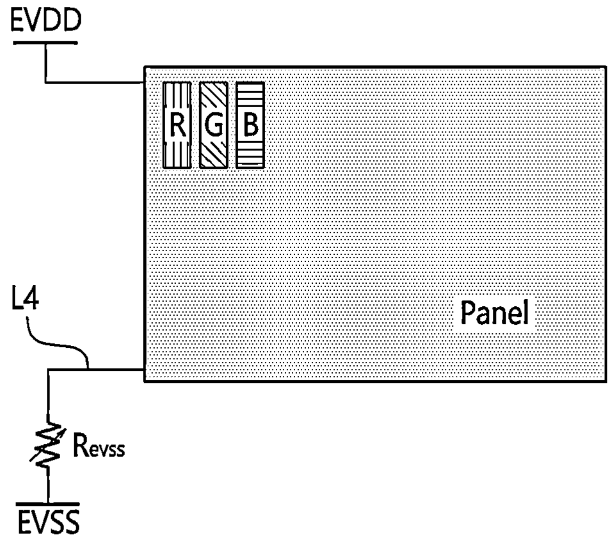

FIG. 7 is an example view illustrating a cause of occurrence of a difference between a W emission luminance and the sum of R, G, and emission luminances. FIGS. 8 and 9 are equivalent circuit diagrams illustrating examples of a partial pixel structure of a micro display device according to the present embodiments.

Referring to FIGS. 4 and 7, e.g., as shown on the left side of FIG. 7, when only the first switch SW1 is turned on by switching of the demultiplexer DEMUX, a data voltage can be applied to the first data line DL1 so that the red subpixel can emit light.

Specifically, the storage capacitor Cst1 illustrated in FIG. 8 is charged with the data voltage for light emission of the red subpixel, and the red OLED emits light based on the charged voltage.

The left graph of FIG. 7 illustrates an example of a state of a data voltage charged to the storage capacitor Cst1 for red light emission. It can be identified that during the actual light emitting operation, the data charging state (solid line) of the storage capacitor Cst1 is not sufficiently charged compared to the dashed line illustrated as being ideal due to RC delay, etc.

Similarly, when only the second switch SW2 is turned on, a data voltage can be applied to the second data line DL2 so that the green subpixel can emit light, and when only the third switch SW3 is turned on, a data voltage can be applied to the third data line DL3 so that the blue subpixel can emit light. Likewise, during the actual light emitting operation, the data charging state (solid line) of the storage capacitors Cst2 and Cst3 is not sufficiently charged compared to the dashed line illustrated as being ideal due to RC delay or the like.

As shown on the right side of FIG. 7, when the first switch SW1, the second switch SW2, and the third switch SW3 are sequentially turned on by the switching of the demultiplexer DEMUX, a data voltage is sequentially applied to the first data line DL1, the second data line DL, and the third data line DL3, so that all of the red subpixel, the green subpixel, and the blue subpixel emit light, and thus white light can be emitted and recognized by a viewer. Even if the red subpixel, the green subpixel, and the blue subpixel emit light sequentially, they are turned on at very short time intervals, so they can be considered to emit light substantially simultaneously (e.g., even though the red light, green light and blue light are emitted at slightly different timings, the timings are so fast and close together, that their emissions appear simultaneous to a human viewer and combine to form white light).

The graph on the right side of FIG. 7 illustrates an example of a state of a data voltage charged to each storage capacitor Cst1, Cst2, and Cst3 for white light emission. Since the input terminal voltage, e.g., the data voltage applied from the output terminal of the demultiplexer to the data line experiences less of a swing than the left graph of FIG. 8 (e.g., the data voltage is maintained at a high level for the three different subpixels), it can be identified that the data charging state (solid line) of each of the storage capacitors Cst1, Cst2, and Cst3 is sufficiently charged to be close to the dashed line illustrated as ideal.

The numerical value L(R)+L(G)+L(B) which is the sum of the respective emission luminances of the red subpixel, the green subpixel, and the blue subpixel is shown to be smaller than the numerical value of the white emission luminance L(W). Experimentally, during 3:1 Mux-based display panel 110 driving, the L(R)+L(G)+L(B) value, which is the sum of the respective emission luminances of R, G, and B, is only about 84% of the white emission luminance L(W) obtained by simultaneous light emission of R, G, and B.

The shortage of charging of the storage capacitor Cst that causes such a difference is due to, firstly, insufficient charging time due to RC delay and secondly a swing of the input terminal voltage (e.g., Red 5V, Green 0V, Blue 0V). This is because even if the signal of the demultiplexer is turned on in time, the state of the previous output data affects the final charging voltage of the storage capacitor Cst (e.g., transitioning from 0V to 5V takes some time and luminance will be lower than when maintaining 5V for consecutive emissions of two more subpixels within a same pixel unit). Thus, a color luminance ratio imbalance may be noticeable by a viewer, which may be even more apparent when using a small display device that is held very close to a user's eyes, such as a VR display. For example, a color luminance ratio imbalance can cause color distortion between pixel units that display part of an image that is predominantly one solid primary color (e.g., mainly just green, mainly just red, or mainly just blue) and pixel units that display part of the image that is white or predominantly white, which can impair image quality and cause eye strain and fatigue. For example, some parts of the display may appear too dim (e.g., pixel units displaying predominantly one primary color) and other parts of the display may appear too bright or washed out (e.g., pixel units displaying white), which can result in luminance inconsistencies that may be undesirably noticeable to the user.

In order to address this issue, an embodiment of the disclosure addresses the luminance increase phenomenon that occurs according to the charging voltage of the storage capacitor during white light emission and high-current driving.

Referring to FIG. 8, an embodiment of the disclosure includes a structure in which all of the light emitting structures disposed in the red subpixel R, the green subpixel G, and the blue subpixel B simultaneously emit light to emit white light. Alternatively, each of the red subpixel R, the green subpixel G, and the blue subpixel B illustrated in FIG. 8 can be individually driven to implement red light emission, green light emission, and blue light emission.

FIG. 8 illustrates an example in which the red subpixel R, the green subpixel G, and the blue subpixel B are arranged in the horizontal direction on the display panel 100, but the disclosure is not limited thereto, and the red subpixel R, the green subpixel G, and the blue subpixel B can be arranged in other arrangements.

Referring to FIGS. 8 and 9, an embodiment of the disclosure addresses the illuminance increase phenomenon that occurs according to the charging voltage of the storage capacitor during white light emission and high-current driving by providing a first resistance unit at a first power source voltage line end.

Referring to FIG. 8, the first power source voltage can be a low-potential driving voltage EVSS. The first power source voltage line can include a line L1 connected to the anode line of the first light emitting element ED1 from the first power source voltage supply terminal EVSS, a line L2 connected to the anode line of the second light emitting element ED2 from the first power source voltage supply terminal EVSS, and a line L3 connected to the anode line of the third light emitting element ED3 from the first power source voltage supply terminal EVSS.

The first resistance unit can be provided in at least a portion of the first power source voltage line connected between the first power source voltage supply terminal EVSS and each of the light emitting elements ED1, ED2, and ED3. For example, the light emitting elements ED1, ED2, and ED3 can be connected in common to one end of first resistance unit and another end of the first resistance unit can be connected to the first power source voltage supply terminal EVSS.

The first resistance unit can include a fixed resistance element or a variable resistance element.

The first resistance unit can be provided as a resistance element or a TFT transistor.

FIG. 8 illustrates a situation in which the first resistance unit is provided as the TFT transistor T3, and the TFT transistor T3 is provided in the display panel 100. For example, the TFT transistor T3 can be provided in the display area or can be provided in the non-display area.

The lower graph of FIG. 8 is an i-v transfer graph showing changes in flowing current i according to changes in the gate voltage v for the transistor.

As in the graph showing the current-voltage transfer characteristics of the transistor shown on the lower side of FIG. 8, when the first resistance unit is provided as the TFT transistor T3, the TFT transistor T3 can be used as a resistor in the linear area section of the i-v curve of the TFT transistor T3 corresponding to the circled dashed line portion.

The source node of the TFT transistor T3 can be connected to the cathode electrode of the green subpixel, the drain node can be connected to the first power source voltage supply terminal EVSS, and the gate node can be connected to the anode electrode of the red subpixel, the anode electrode of the green subpixel, and the anode electrode of the blue subpixel. In other words, the source electrode of the TFT transistor T3 can be connected in common to the cathode electrodes of the red, green and blue subpixels, the gate electrode of TFT transistor T3 can be connected in common to the anode electrodes of the red, green and blue subpixels, and the drain electrode of the TFT transistor T3 can be connected to the first power source voltage supply terminal EVSS.

Alternatively, as illustrated in FIG. 9, the first resistance unit can be provided outside of the display panel 100 (e.g., external to the display panel 100). In this situation, the first resistance unit can be connected to at least a partial line LA of the first power source voltage line connected between the first power source voltage supply terminal EVSS and the display panel 100. FIG. 9 illustrates a situation in which a variable resistance element Revss is connected as a first resistance unit.

The variable resistance element Revss can be provided to vary the resistance value of the first resistance unit according to the body effect in which the threshold voltage varies according to the voltage applied to a transistor provided in the display panel 100.

Figure 10:
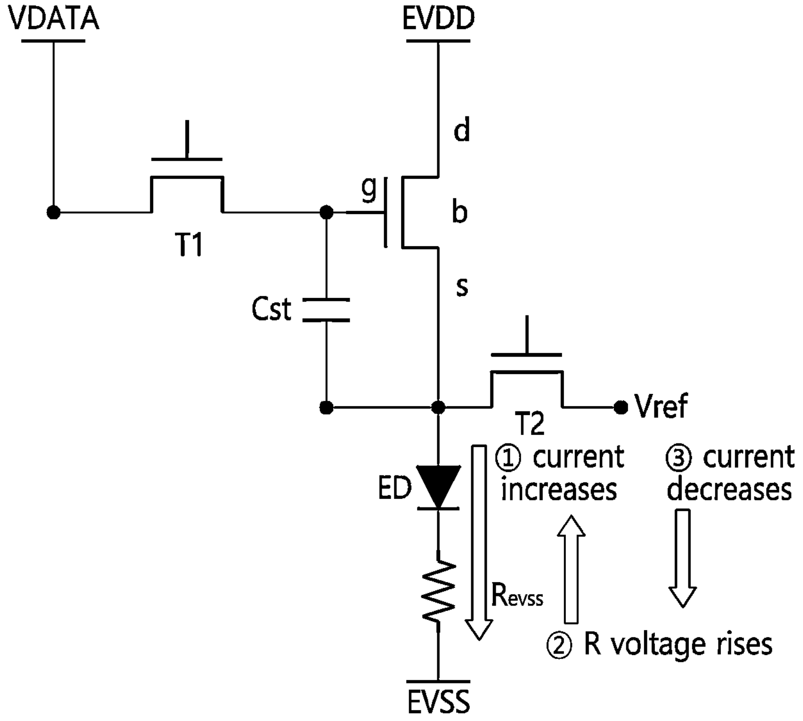
FIG. 10 is an example circuit diagram illustrating driving for dropping a luminance increase that occurs according to a charging voltage of a storage capacitor during white emission and high-current driving according to an embodiment of the present disclosure.

FIG. 10 is an example circuit diagram illustrating driving for dropping a luminance increase that occurs according to a charging voltage of a storage capacitor during white emission and high-current driving according to an embodiment of the disclosure.

Referring to FIG. 10, a display panel according to an embodiment of the disclosure includes a first resistance unit Revss connected between a first power source voltage supply terminal EVSS and a light emitting element ED of a subpixel.

When the current for light emission of the light emitting element flows through the light emitting element ED, the voltage across two opposite ends of the first resistance unit Revss increases.

Accordingly, as shown in Equation 1 below, as the voltage of the first resistance unit Revss increases, the voltage of the anode end of the light emitting element ED increases, and thus the Vsb voltage increases, and thus the IOLED current decreases. When the Vsb voltage increases, the influence by the body effect increases.

[Equation 1]

$$i_{OLED} = \frac{1}{2}\mu C_{OX}\frac{W}{L}(V_{gs} - V_{thN})^2$$

$$V_{thN} = V_{th} + \alpha V_{sb} \ (\alpha\text{: Body-effect coefficient})$$

$$\therefore i_{OLED} = \frac{1}{2}\mu C_{OX}\frac{W}{L}(V_{gs} - (V_{th} + \alpha V_{sb}))^2$$

In Equation 1 above, μ: Transistor Mobility, W: Transistor Channel Width, L: Transistor Channel Length, VthN: New threshold voltage changed by body effect, Vth: Threshold voltage when there is no body effect, α: Body-effect coefficient, and Vsb: Voltage source-body.

As described above, the TFT transistor T3 can be provided in at least a portion of the first power source voltage line of one pixel constituted of the red subpixel R, the green subpixel G, and the blue subpixel B in the pixel circuit inside the display panel 100, and the TFT transistor T3 can be driven in the linear section to operate as a resistor, so that the voltage drop (IR drop) can be greater when the red, green, and blue light emitting elements are controlled to simultaneously emit light to implement white emission than when the red, green, and blue light emitting elements are controlled to individually emit light. In other words, the TFT transistor T3 can act as a type of buffer or counter sink that can dampen the luminance when white light is emitted by a pixel unit so that it is more similar to the luminance of when one primary color is predominantly emitted by the pixel unit (e.g., when just the red subpixel within the pixel unit emits light, etc.). For example, the TFT transistor T3 can step down the brightness when white light is emitted by the pixel unit so that the brightness is about same or similar to when one primary color of light is emitted by the pixel unit. In this way, image quality can be improved because the luminance can be held to be more uniform across the display panel even when displaying white on some parts of the screen and different colors of light on other parts of the screen.

Through the principle, when the red subpixel R, the green subpixel G, and the blue subpixel B simultaneously emit light to emit white light, the IOLED current flowing through the first current voltage line can be reduced, thereby addressing the color luminance ratio issue with the RGB shared micro display.

In other words, the difference between the sum L(R)+L(G)+L(B) of the respective light emission luminances of the red subpixel, the green subpixel, and the blue subpixel and the white light emission luminance L(W) can be reduced and more uniform luminance can be provided.

Figure 11:
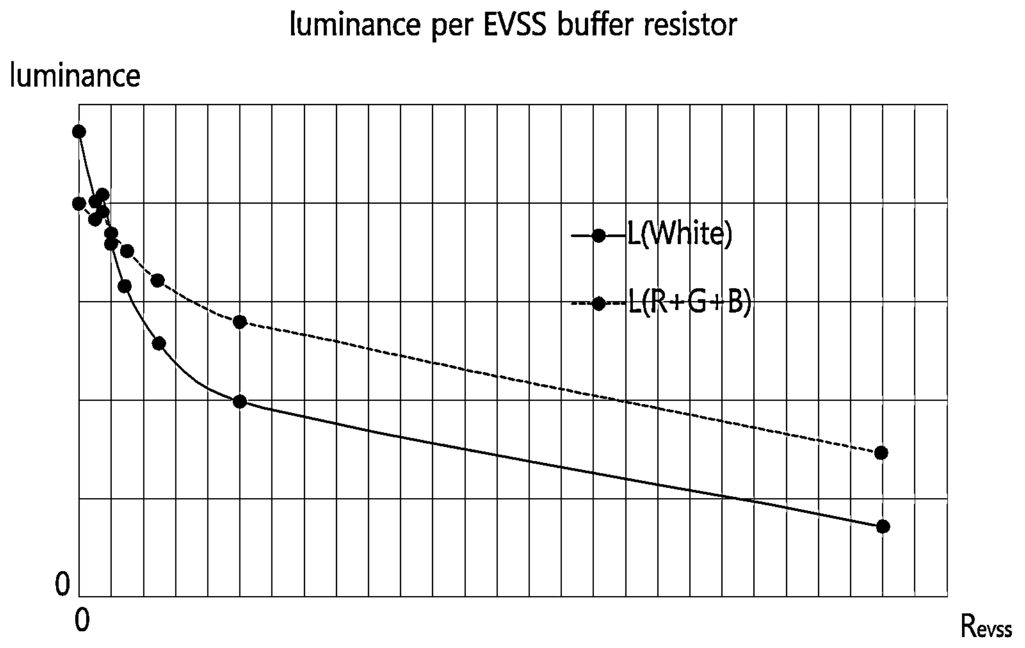
FIG. 11 illustrates a graph and table showing luminance comparison between per-resistance white emission of a first resistance unit and R, G, and B individual emissions according to an embodiment of the present disclosure.

FIG. 11 illustrates a graph and table showing luminance comparison between per-resistance white emission of a first resistance unit and R, G, and B individual emissions according to an embodiment of the disclosure.

Referring to FIG. 11, it can be identified that the voltage drop (IR drop) is greater when allowing the red, green, and blue light emitting elements to simultaneously emit light to emit white light than when allowing the red, green, and blue light emitting elements to individually emit light by providing the first resistance unit in at least a portion of the first power source voltage line of one pixel constituted of the red subpixel R, the green subpixel G, and the blue subpixel B, so that the luminance is reduced.

The micro display according to the above-described embodiments of the disclosure can be provided in a virtual reality (VR) device or an augmented reality (AR) device.

The above-described display panel according to embodiments of the disclosure can be briefly described again below.

A micro display device can comprise a pixel unit disposed on a display panel and including a red subpixel, a green subpixel, and a blue subpixel, a first power source voltage line including a first line connected between a first power source voltage supply terminal and the red subpixel, a second line connected between the first power source voltage supply terminal and the green subpixel, and a third line connected between the first power source voltage supply terminal and the blue subpixel, and a first resistance unit connected to at least a portion of the first power source voltage line.

The first resistance unit can include a fixed resistance element.

The first resistance unit can include a variable resistance element.

A resistance value of the variable resistance element can be varied according to a body effect in which a threshold voltage is varied according to a voltage applied to a transistor provided in the display panel.

The first resistance unit can be provided in a display area of the display panel.

The first resistance unit can be provided in a non-display area of the display panel.

The first resistance unit can be provided outside of the display panel.

The first resistance unit can be provided as a TFT transistor.

In the first resistance unit, the TFT transistor can be used as a resistor in a linear mode section of the TFT transistor.

A source node of the TFT transistor can be connected to a cathode electrode of the green subpixel, a drain node can be connected to the first power source voltage supply terminal, and a gate node can be connected to an anode electrode of the red subpixel, an anode electrode of the green subpixel, and an anode electrode of the blue subpixel.

The red subpixel, the green subpixel, and the blue subpixel can be arranged in a horizontal direction on the display panel.

The red subpixel, the green subpixel, and the blue subpixel can emit white light through simultaneous light emission.

The foregoing features, structures, or effects are included in, but not limited to, at least one embodiment of the disclosure. The features, structures, or effects exemplified in at least one example of the disclosure can be combined or modified by one of ordinary skill in the art in other embodiments. Thus, such combinations or modifications should be interpreted as belonging to the scope of the disclosure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A micro display device, comprising:

a pixel unit disposed on a display panel, the pixel unit including a red subpixel, a green subpixel and a blue subpixel;

a first power source voltage line including a first line connected between a first power source voltage supply terminal and the red subpixel, a second line connected between the first power source voltage supply terminal and the green subpixel, and a third line connected between the first power source voltage supply terminal and the blue subpixel; and a first resistance unit connected to at least a portion of the first power source voltage line, wherein a first end of the first resistance unit is connected in common to the red, green blue subpixels of the pixel unit, and a second end of the first resistance unit is connected to the first power source voltage supply terminal.

2. The micro display device of claim 1, wherein the first resistance unit includes a fixed resistance element.

3. The micro display device of claim 1, wherein the first resistance unit includes a variable resistance element.

4. The micro display device of claim 3, wherein a resistance value of the variable resistance element is configured to vary based on a body effect in which a threshold voltage is varied according to a voltage applied to a transistor provided in the display panel.

5. The micro display device of claim 1, wherein the first resistance unit is disposed in a display area of the display panel.

6. The micro display device of claim 1, wherein the first resistance unit is disposed in a non-display area of the display panel.

7. The micro display device of claim 1, wherein the first resistance unit is disposed outside of the display panel.

8. The micro display device of claim 1, wherein the first resistance unit is a thin film transistor.

9. The micro display device of claim 8, wherein the thin film transistor is configured to be used as a resistor in a linear mode section of the thin film transistor.

10. The micro display device of claim 8, wherein a source node of the thin film transistor is connected to a cathode electrode of the green subpixel, a drain node of the thin film transistor is connected to the first power source voltage supply terminal, and a gate node of the thin film transistor is connected to an anode electrode of the red subpixel, an anode electrode of the green subpixel and an anode electrode of the blue subpixel.

11. The micro display device of claim 1, wherein the red subpixel, the green subpixel, and the blue subpixel are arranged in a horizontal direction on the display panel.

12. The micro display device of claim 1, wherein the red subpixel, the green subpixel, and the blue subpixel are configured to emit white light through simultaneous light emission.

13. A display device comprising:

a pixel disposed on a substrate, the pixel including a first color subpixel configured to emit light of a first color, a second color subpixel configured to emit light of a second color and a third color subpixel configured to emit light of a third color;

a data driver disposed on the substrate, the data driver being connected to a plurality of data lines;

a gate driver disposed on the substrate, the gate driver being connected to a plurality of gate lines;

a demultiplexer connected between one data line among the plurality of data lines and the first, second and third color subpixels within the pixel; and a first resistance unit connected between the pixel and a first power source voltage line, wherein a first end of the first resistance unit is connected in common to the first, second and third color subpixels of the pixel, and a second end of the first resistance unit is connected to the first power source voltage line.

14. The display device of claim 13, wherein the first resistance unit is configured to reduce a luminance of the pixel when the first, second and third color subpixels emit white light.

15. The display device of claim 13, wherein the first resistance unit has a fixed resistance.

16. The display device of claim 13, wherein the first resistance unit has a variable resistance.

17. The display device of claim 13, wherein the first resistance unit is disposed external to the substrate.

18. The display device of claim 13, wherein the first resistance unit is disposed on the substrate that includes the pixel, the data driver and the gate driver.

19. The display device of claim 13, wherein the first resistance unit is a thin film transistor, wherein the first color subpixel includes a first light emitting element having a first electrode and a second electrode, the second color subpixel includes a second light emitting element having a first electrode and a second electrode, and the third color subpixel includes a third light emitting element having a first electrode and a second electrode, wherein a gate electrode of the film transistor is connected in common to the first electrode of the first light emitting element in the first color subpixel, the first electrode of the second light emitting element in the second color subpixel and the first electrode of the third light emitting element in the third color subpixel, wherein a first electrode of the thin film transistor is connected in common to the second electrode of the first light emitting element in the first color subpixel, the second electrode of the second light emitting element in the second color subpixel and the second electrode of the third light emitting element in the third color subpixel, and wherein a second electrode of the thin film transistor is connected to the first power source voltage line.

20. A display device comprising:

a pixel disposed on a substrate, the pixel including a first color subpixel configured to emit light of a first color, a second color subpixel configured to emit light of a second color and a third color subpixel configured to emit light of a third color;

a demultiplexer connected between one data line among a plurality of data lines and the first, second and third color subpixels within the pixel; and a first resistance unit connected between the pixel and a first power source voltage line, wherein the first resistance unit is a thin film transistor, wherein the first color subpixel includes a first light emitting element having a first electrode and a second electrode, the second color subpixel includes a second light emitting element having a first electrode and a second electrode, and the third color subpixel includes a third light emitting element having a first electrode and a second electrode, wherein a gate electrode of the film transistor is connected in common to the first electrode of the first light emitting element in the first color subpixel, the first electrode of the second light emitting element in the second color subpixel and the first electrode of the third light emitting element in the third color subpixel, wherein a first electrode of the thin film transistor is connected in common to the second electrode of the first light emitting element in the first color subpixel, the second electrode of the second light emitting element in the second color subpixel and the second electrode of the third light emitting element in the third color subpixel, and wherein a second electrode of the thin film transistor is connected to the first power source voltage line.

* * * * *